United States Patent Office 3,540,284
Patented Nov. 17, 1970

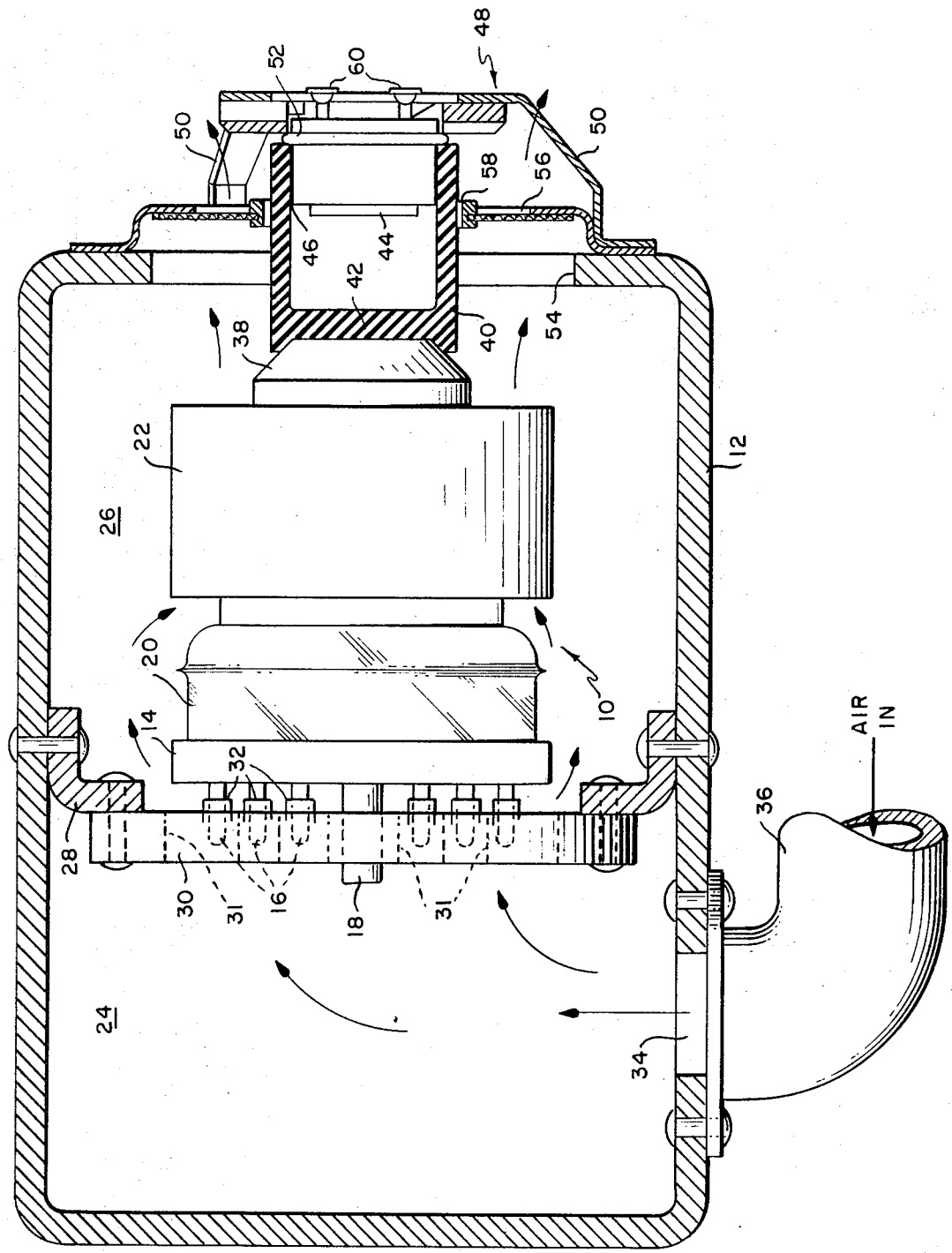

3,540,284
ELECTRICALLY INSULATED THERMO-SENSING UNIT
Paul H. Sellers, Norfolk, and Louis T. Croneberger, Virginia Beach, Va., assignors to the United States of America as represented by the Secretary of the Navy
Filed Oct. 30, 1968, Ser. No. 771,802
Int. Cl. G01k 1/16
U.S. Cl. 73—362.8
8 Claims

ABSTRACT OF THE DISCLOSURE

A unit for measuring temperature of a tube within a RF shield, the tube being subject to high DC voltages and high RF fields. Beryllium oxide is placed in contact with the tube at a point where temperature is to be measured. The beryllium oxide is extended to the outside of the shield. A sensing device is placed in contact with the beryllium oxide outside of the shield and the sensing device is thereby thermally coupled to the tube inside the shield because the beryllium oxide, while being an electrical insulator, is also a good conductor of heat.

---

The invention described herein may be manufactured and used by or for the Government of the United States of America for governmental purposes without the payment of any royalties thereon or therefor.

BACKGROUND OF THE INVENTION

This invention relates generally to thermostats and other thermal-sensing devices and more particularly to a thermal sensing device which may be electrically isolated from the radio frequency fields and high direct current potentials which exist at the desired thermal measuring point, but yet thermally conductive with the device whose temperature is to be measured.

It is particularly desirable in high performance radio transmitters to both monitor the temperature of and to protect electron tubes in the circuit which are operating at high capacity. The radio frequency output tubes of modern transmitters are generally operated at full capacity and must be cooled by forced draft from auxiliary fans rather than relying merely on convection currents. Because of the high heat output of these tubes such as, for example, the 4 x 150 type, these tubes have anodes external of the glass and/or ceramic envelope. These tubes will readily fail if their capacity is exceeded or if the auxiliary cooling means is interrupted. It is, therefore, desirable to either monitor their temperature so that the tube may be turned off manually, or provide a thermostatic switch which will automatically turn off the tube.

High output radio frequency tubes are generally RF shielded by metal enclosures or the like to eliminate the radiation of stray RF fields from the tube and its circuits. The circuits in which these tubes operate are critically reactance tuned and contain high DC and RF potentials. Attempts in the past to monitor the temperature of tubes or to automatically turn them off in the event of over-temperature conditions have been to use thermocouples, mercury thermometers and thermostats within the RF fielding enclosure but there are a number of distinct disadvantages. A disadvantage common to these methods is that they measure the air temperature within the shielding enclosure rather than the tube directly and therefore cannot provide instant response to tube temperature changes. Another disadvantage peculiar to mercury column thermometers is that when they are subjected to high radio frequency fields the column of mercury is RF heated to a temperature as much as 10 to 20 percent above the true temperature. Thermocouples in radio frequency fields are also unpredictable and produce an error in temperature indication due to the diode action of the couple subject to the RF field. This rectified voltage (diode effect) may be many times that of the actual voltage generated by the thermocouple due to heat alone. Both of these temperature monitoring devices cannot be placed directly in the radio frequency field existing with the RF shielding enclosure because they disrupt the reactance tuned circuit and can also carry the hazardous DC and RF voltages out of the shielded enclosure to produce high voltages at the remote readout device and produce stray RF fields outside of the shielding enclosure.

SUMMARY OF THE INVENTION

The purpose of this invention is to directly monitor the temperature of a device such as, for example, a tube which is in the high RF field and subjected to high DC potentials, and yet not affect the critical reactance tuned circuit by the imposition of a metal or cause the DC potential and RF field to be emitted from the shielding enclosure. According to the invention, a compound having the properties of high thermal conductivity but low electrical and RF conductivity in contact with a device to be measured and also the thermostat or thermal monitoring device would overcome the aforementioned disadvantages. A suitable compound is beryllium oxide available from the National Beryllia Corporation. For the first time this compound is being used as an insulator in radio frequency applications.

In the particular application contemplated by this invention a spacer made of beryllium oxide is placed in contact with the metal anode of an RF output tube of a transmitter. The other end of the spacer is in contact with a thermal monitoring unit which is located outside the RF shielding enclosure. The features of beryllium oxide also find application in temperature measurement of radio frequency components such as coils, capacitors, and special circuits under actual operating conditions, the reactance of which would be upset by the interposing into the radio frequency field of a metallic object such as the thermostat, thermocouple, or mercury column thermometer. Beryllium oxide is known to be an excellent insulator for use in electrical circuits and concomitantly to have a thermal conductivity equivalent to aluminum. It therefore may be placed directly in contact with the metal anode of an RF electron tube to transfer the heat to a remote thermal sensing unit.

Accordingly, it is the principal object of this invention to provide for the direct thermal monitoring of a device in an environment of high RF fields and high DC voltages without disturbing said fields or conducting said voltages away from the device.

Another object of this invention is to provide a thermal sensing electrical switch device for monitoring the temperature of a radio frequency electron tube, and to interrupt the current to said tube to avoid an over-temperature condition.

Still another object of this invention is to provide a high thermal conductivity, electrical insulator between the device whose temperature is to be measured and a thermal sensing unit.

These and other attendant advantages and objects of the invention will become apparent to those skilled in the art upon reference to the accompanying specifications, claims and drawings in which:

BRIEF DESCRIPTION OF THE DRAWINGS

The figure is a cut-away elevation view of an electron tube within an enclosure and attached to the anode of the tube is a spacer having a thermal sensing unit mounted thereon.

DESCRIPTION OF THE PREFERRED EMBODIMENT

Referring to the figure there is shown for purposes of illustration only a radio frequency transmitting tube 10 of the 4 x 150 type mounted within a radio frequency shielding enclosure 12. Electron tube 10 comprises a base 14 having a plurality of connecting pins 16 and an indexing pin 18 for insertion into and connection with a tube socket 30, a glass evelope 20 containing typical tube components of filament, cathode, and grid (all not shown), and an external anode 22 comprising radial fins and a band about the periphery of the distal ends of the fins thereby creating axial slots for the conducting of cooling air forced up from the tube base 14.

The radio frequency shielding enclosure 12 is compartmented to form an input portion 24 and output portion 26 by a barrier plate 28. Attached to the barrier plate 28, by any conventional fastener means, is a tube socket 30 having spring connecting clips 32 for engaging pins 16 of the tube 10 as well as having apertures 31 for receiving the indexing pin 18 and for conducting forced air for cooling the tube. A forced air duct 36 is secured at an aperture 34 in the input portion 24 of the RF shielding enclosure 12.

Opposite the tube base 14 the anode 22 is terminated in a solid metal cap 38 of frusto-conical form for an electrical termination purpose. Bearing on the end portion of the anode cap 38, there is an insulating spacer 40 made of beryllium oxide. The insulating spacer 40 at its closed end 42 is in intimate physical and thermal contact with the anode cap 38. The insulating spacer 40 is of cylindrical cup-shape form and has inserted at the open outer end a thermal sensing device 44 such as a thermostat. A heat conducting solder 46 or the like provides intimate thermal contact between the thermal sensing device 44 and the internal periphery of the insulating spacer 40. A retainer assembly 48 having spring fingers 50 is secured to the RF shielding enclosure 12 and provides spring bias on the upset flange 52 of the thermal sensing device 44. Thereby, the sensing unit 44, the spacer 40, and the anode cap 38 are all retained in intimate contact for the transfer of heat.

An access aperture 54 is provided in the RF enclosure 12 for maintenance access and for inserting and removing the tube 10. To maintain RF shielding integrity, screen assembly 56 is secured to the RF shielding enclosure 12 over the access aperture 54. A ring 58 mounted in the screen assembly 56 is provided for permitting the insulating spacer 40 to pass through. Electrical terminals 60 on the thermal sensing device 44 are for connection to the electrical circuit to be controlled such as the tube filaments.

DESCRIPTION OF THE OPERATION

As previously discussed, high performance radio frequency electron tubes require force draft cooling. It is also necessary to isolate the input circuits in RF enclosure 24 from the output circuits in the RF enclosure 26 by an RF shielding barrier 28. For cooling purposes, a duct 36 is attached over aperture 34 in the input circuit portion 24 of the RF enclosure 12 and tends to pressurize said input portion. This air pressure is exhausted through the apertures of tube socket 30 and the exiting air which flows into the output circuit portion 26 flows over the glass envelope 20 and thence through radiating fins of the anode 22 and thence out the exhaust screen 56.

Due to the force draft cooling, it is obvious that the ambient temperature within the output circuit portion 26 of the RF enclosure 12 would not be representative of the temperature of anode 22 and would lag considerably an overheating condition of said anode. It is also to be understood high DC voltages as well as high RF potentials that exist on the anode 22 and the cap portion 38 are electrically isolated but thermally conducting with the thermal sensing unit 44 by means of the insulating spacer 40 made of beryllium oxide.

As can be seen, this invention provides the following novel and advantageous features: The temperature of the device may be measured directly on its surface even though it possesses high DC and RF potentials; no metallic substance is interposed to disrupt critically reactance tuned circuits; RF shielding of the device is maintained within the enclosure; and no electrical hazard exists outside the enclosure. Furthermore, mercury column thermometers and thermocouples may be used to measure the aforementioned device by merely changing the configuration of the insulating spacer to fit any particular electronic device which temperature is to be measured, and to fit the particular indicator.

It is to be understood that the invention is not limited to the exact details of the construction shown and described for obvious modifications will occur to persons skilled in the art.

What is claimed is:

1. A sensing unit for monitoring the temperature of an electronic device operating at radio frequencies comprising:
    an RF shielding enclosure for containing said electronic device and the RF field emitted thereby;
    thermal sensing means mounted adjacent, but positioned outside said enclosure for monitoring the temperature of said electronic device; and
    an electrically insulating, thermally conducting spacer in intimate contact with said electronic device and said thermal sensing means.

2. The sensing unit of claim 1, wherein said electrical insulating, heat conducting spacer is made of a ceramic.

3. The sensing unit of claim 2, wherein said ceramic is beryllium oxide.

4. The sensing unit of claim 1, wherein said electrically insulating, thermally conducting spacer is interposed between said electronic device and said thermal sensing means.

5. The sensing unit of claim 1 wherein said thermal sensing means is a thermostatic switch.

6. The sensing unit of claim 1 wherein said thermal sensing means is a temperature indicator.

7. In a system including:
    a high frequency element whose operating temperature is to be measured;
    a shielding enclosure substantially surrounding said element; and
    a thermal sensing unit outside said enclosure;
    the combination therewith of an electrically insulating thermally conducting spacer in intimate contact with said element, said spacer functioning as a thermal transfer element and being connected to said thermal sensing unit.

8. In the system of claim 7, said spacer consisting of beryllium oxide.

References Cited

UNITED STATES PATENTS

| | | | |
|---|---|---|---|
| 2,859,383 | 11/1958 | Woods | 315—85 |
| 3,005,171 | 10/1961 | Beckman | 338—28 |

LOUIS R. PRINCE, Primary Examiner

D. E. CORR, Assistant Examiner

U.S. Cl. X.R.

313—10